United States Patent
Ogawa

(10) Patent No.: US 10,416,650 B2
(45) Date of Patent: Sep. 17, 2019

(54) WAVEFORM DISPLAY DEVICE HAVING FUNCTION OF ACQUIRING DATA RELATED TO DRIVING AXIS OF MACHINE TOOL

(71) Applicant: FANUC Corporation, Yamanashi (JP)

(72) Inventor: Yoshitsugu Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 129 days.

(21) Appl. No.: 15/092,740

(22) Filed: Apr. 7, 2016

(65) Prior Publication Data

US 2016/0299488 A1 Oct. 13, 2016

(30) Foreign Application Priority Data

Apr. 8, 2015 (JP) ................. 2015-079143

(51) Int. Cl.
*G05B 19/19* (2006.01)
*G05B 19/4065* (2006.01)

(52) U.S. Cl.
CPC ........... *G05B 19/4065* (2013.01); *G05B 2219/31472* (2013.01)

(58) Field of Classification Search
None
See application file for complete search history.

(56) References Cited

U.S. PATENT DOCUMENTS 5,301,120 A * 4/1994 Magario ............... B29C 45/768
264/40.1
2001/0037180 A1 11/2001 Komura et al.
(Continued)

FOREIGN PATENT DOCUMENTS

CN  104007695 A  8/2014
DE  69201947 T2  12/1995
(Continued)

OTHER PUBLICATIONS

Office Action in DE Application No. 102016106084.4, dated Oct. 19, 2017, 11 pp.
(Continued)

*Primary Examiner* — Brian W Wathen
*Assistant Examiner* — Hung H Dang
(74) *Attorney, Agent, or Firm* — Hauptman Ham, LLP

(57) ABSTRACT

Since a data acquisition condition setting unit can select a data acquisition start/end trigger, a sampling period of data, and a type of acquired data, a waveform display device, which has a function of allowing only necessary data to be acquired by allowing a plurality of data acquisition conditions to be set with respect to one data acquisition, can set these conditions from a screen of a data acquisition condition setting. When data needs to be acquired according to a plurality of different conditions, a plurality of types of necessary data acquisition conditions is set to set different data acquisition condition names. When a plurality of data acquisition conditions is set by acquiring data once, a multi-data acquisition condition setting unit can set necessary data acquisition conditions using a screen of a multi-data acquisition condition setting. When the data acquisition conditions are set by the multi-data acquisition condition setting unit, data acquisition condition setting names set by the data acquisition condition setting unit are input.

5 Claims, 13 Drawing Sheets

(56) References Cited

U.S. PATENT DOCUMENTS

| | | |
|---|---|---|
| 2004/0068394 A1 | 4/2004 | Maekawa et al. |
| 2007/0068910 A1 | 3/2007 | Ikeda et al. |
| 2013/0096700 A1 | 4/2013 | Tezuka et al. |
| 2013/0222391 A1* | 8/2013 | Tezuka .................... G06T 11/20 345/440.1 |
| 2014/0244024 A1 | 8/2014 | Tezuka |

FOREIGN PATENT DOCUMENTS

| | | |
|---|---|---|
| DE | 10119209 A1 | 10/2001 |
| DE | 60310661 T2 | 5/2007 |
| EP | 0552506 A1 | 7/1993 |
| JP | 2001125612 A | 5/2001 |
| JP | 2007004601 A | 1/2007 |
| JP | 5302371 B2 | 10/2013 |
| JP | 5416238 B2 | 2/2014 |
| WO | 2006006517 A1 | 1/2006 |

OTHER PUBLICATIONS

Decision to Grant a Patent in Japanese Patent Application No. 2015-079143, dated Aug. 9, 2016.
Office Action in CN Application No. 201610218033.2, dated Jun. 22, 2018, 15pp.

* cited by examiner

WAVEFORM DISPLAY DEVICE HAVING FUNCTION OF ACQUIRING DATA RELATED TO DRIVING AXIS OF MACHINE TOOL

RELATED APPLICATIONS

The present application claims priority to Japanese Patent Application Number 2015-079143, filed Apr. 8, 2015, the disclosure of which is hereby incorporated by reference herein in its entirety.

BACKGROUND OF THE INVENTION

1. Field of the Invention

The present invention relates to a waveform display device capable of acquiring various data (a position, a speed, a torque, and the like) related to a driving axis by being connected to a numerical controller of a machine tool, and displaying the data as waveforms.

2. Description of the Related Art

Manufacturing costs, quality of a finished product, and a life of a production facility are significantly important to a user of a machine tool. For this reason, the user of the machine tool performs an operation below in some cases. First, a current processing program or various parameters are changed to shorten a cycle time, improve quality of a processed surface, and reduce an impact on the machine tool due to acceleration and deceleration of a axis. Then, whether a desired state is achieved is determined by comparing waveforms of data obtained before and after the change. When the desired state has not been achieved, the processing program and the parameters are changed again. The desired state is nearly achieved by repeating this operation.

Here, the cycle time of the processing program affects cost of the finished product, quality of the processed surface affects quality of the finished product processed by the machine tool, and the impact on the machine tool affects a life of the machine tool. In particular, with regard to mass-produced finished products, a small difference may generate a great difference in manufacturing cost or damage to the production facility. Thus, adjustment of the processing program and the various parameters is an operation that needs to be sufficiently examined.

A waveform display device is used in this important operation. When data obtained after adjustment is compared with data obtained before adjustment, a clue to evaluation or improvement of a state after adjustment can be obtained. JP 5302371 B1 discloses a numerical controller having a function of displaying physical data of the machine tool. In addition, JP 5416238 B1 discloses a waveform display device having a function of managing data.

In general, to acquire necessary data, first, a type of the data to be acquired (a position, a speed, a torque, and the like) is selected, and a data acquisition condition such as a sampling period of the data and a data acquisition start/end trigger is set. Thereafter, a processing program is executed to acquire desired data.

Here, a case is considered in which data is acquired by a processing program A below having five processes to display a waveform (see FIG. 12).

Process 1: Milling 1
Process 2: Drilling
Process 3: Rigid tap (screw cutting) processing
Process 4: End milling
Process 5: Milling 2

In this case, conditions necessary for the respective processes are as below.

In Process 1, necessary data is speeds in an X-axis and a Y-axis and a spindle torque, a sampling period is 10 msec, a data acquisition start trigger is N number 100, and a data acquisition end trigger is N number 200.

In Process 2, necessary data is a speed in a z-axis and the spindle torque, a sampling period is 5 msec, a data acquisition start trigger is N number 300, and a data acquisition end trigger is N number 400.

In Process 3, necessary data is a position on the z-axis, the spindle torque, and a spindle position, a sampling period is 1 msec, a data acquisition start trigger is N number 500, and a data acquisition end trigger is N number 600.

In Process 4, necessary data is a speed in a B-axis (additional axis) and a jerk, a sampling period is 2 msec, a data acquisition start trigger is N number 700, and a data acquisition end trigger is N number 800.

In Process 5, necessary data is the speeds in the X-axis and the Y-axis and the spindle torque, a sampling period is 10 msec, a data acquisition start trigger is N number 900, and a data acquisition end trigger is N number 1000.

N number refers to a sequence number described in the processing program (see FIG. 12).

In this case, two data acquisition methods below are considered in a present state.

<Data Acquisition Method 1>

A first method sets all necessary data types as an object to be acquired, and acquires data using setting of a shortest sampling period. In the above example, types of acquired data need to be set to the speeds in the X-axis and the Y-axis, the position and the speed in the Z-axis, the speed and the jerk in the B-axis, the spindle torque, and the spindle position, a sampling period needs to be set to 1 msec, a data acquisition start trigger needs to be set to N number 100, and a data acquisition end trigger needs to be set to N number 1000.

<Data Acquisition Method 2>

A second method prepares the five types of data acquisition conditions, and temporarily suspends the processing program at the time of starting the respective processes. Then, the second method changes a data acquisition condition to a data acquisition condition corresponding to each of the processes and starts to acquire data. Thereafter, the second method resumes the processing program.

Data acquisition method 1 has demerits in that a lot of unnecessary information is present, a size of acquired data is large, and it takes time to extract data of a part desired to be compared. Specifically, in Process 1, even though data of the B-axis and the like is unnecessary, the data is acquired.

In addition, a sampling period of 10 msec is sufficient. However, if a sampling period is set to 1 msec, the amount of data will increase more than necessary. Further, in Process 2, data of only the position on the Z-axis and the spindle torque is evaluated in drilling. In this case, only data in Process 2 needs to be extracted from all data, and then unnecessary data such as the X, Y, and B-axes needs to be removed since the unnecessary data hinders accurate and rapid evaluation of data.

Data acquisition method 2 is considered to avoid the demerits of Data acquisition method 1. However, an operation time for data acquisition increases since the processing program is temporarily suspended and a data acquisition condition is changed.

JP 5302371 B1 and JP 5416238 B1 fail to disclose a device capable of acquiring data by setting a plurality of data acquisition conditions when data is acquired once.

SUMMARY OF THE INVENTION

In this regard, an object of the invention is to provide a waveform display device having a function capable of acquiring only necessary data by allowing a plurality of data acquisition conditions to be set when data is acquired once.

A waveform display device according to the invention is connected to a numerical controller controlling a driving axis of a machine tool, has a function of acquiring data of a physical quantity related to the driving axis and displaying the data of the physical quantity as a waveform, and includes a physical quantity data acquisition unit for acquiring the data of the physical quantity related to the driving axis from the numerical controller, a physical quantity data acquisition condition setting unit capable of setting a plurality of acquisition conditions including at least a type of the data of the physical quantity, a condition of starting and ending acquisition of the data of the physical quantity, and a sampling period for acquiring the data of the physical quantity to extract data from the data of the physical quantity acquired by the physical quantity data acquisition unit, a physical quantity data extraction unit for extracting data of a physical quantity satisfying the conditions set by the physical quantity data acquisition condition setting unit from the data of the physical quantity related to the driving axis acquired by the physical quantity data acquisition unit, a storage unit for storing the data of the physical quantity extracted by the physical quantity data extraction unit, and a display unit for displaying the data of the physical quantity extracted by the physical quantity data extraction unit as a waveform. According to the invention, a waveform display device can be provided which has a function of allowing only necessary data to be acquired by allowing a plurality of data acquisition conditions to be set with respect to one data acquisition.

Here, a data acquisition condition setting unit 39 and a multi-data acquisition condition setting unit 40 correspond to "the physical quantity data acquisition condition setting unit capable of setting a plurality of conditions including a type of the data of the physical quantity, a condition of starting and ending acquisition of the data of the physical quantity, and a sampling period for acquiring the data of the physical quantity to extract data from the data of the physical quantity acquired by the physical quantity data acquisition unit".

A managed data selection unit 34 corresponds to "the physical quantity data extraction unit for extracting data of a physical quantity satisfying the conditions set by the physical quantity data acquisition condition setting unit from the data of the physical quantity related to the driving axis acquired by the physical quantity data acquisition unit".

The data storage unit 37 corresponds to "the storage unit for storing the data of the physical quantity extracted by the physical quantity data extraction unit".

The display unit 36 corresponds to "the display unit for displaying the data of the physical quantity extracted by the physical quantity data extraction unit as a waveform".

The physical quantity data extraction unit may acquire the data of the physical quantity in parallel based on one or more conditions among the plurality of conditions set by the physical quantity data acquisition condition setting unit. In this case, referring to FIG. 4, it is characterized in that data is acquired in parallel as in a case in which n corresponds to 1 and 2.

BRIEF DESCRIPTION OF THE DRAWINGS

The above-described and other objects and characteristics of the invention are clear from description of embodiments below with reference to accompanying drawings in which.

DETAILED DESCRIPTION OF THE PREFERRED EMBODIMENTS

Hereinafter, embodiments of the invention will be described along with drawings.

Figure 1:
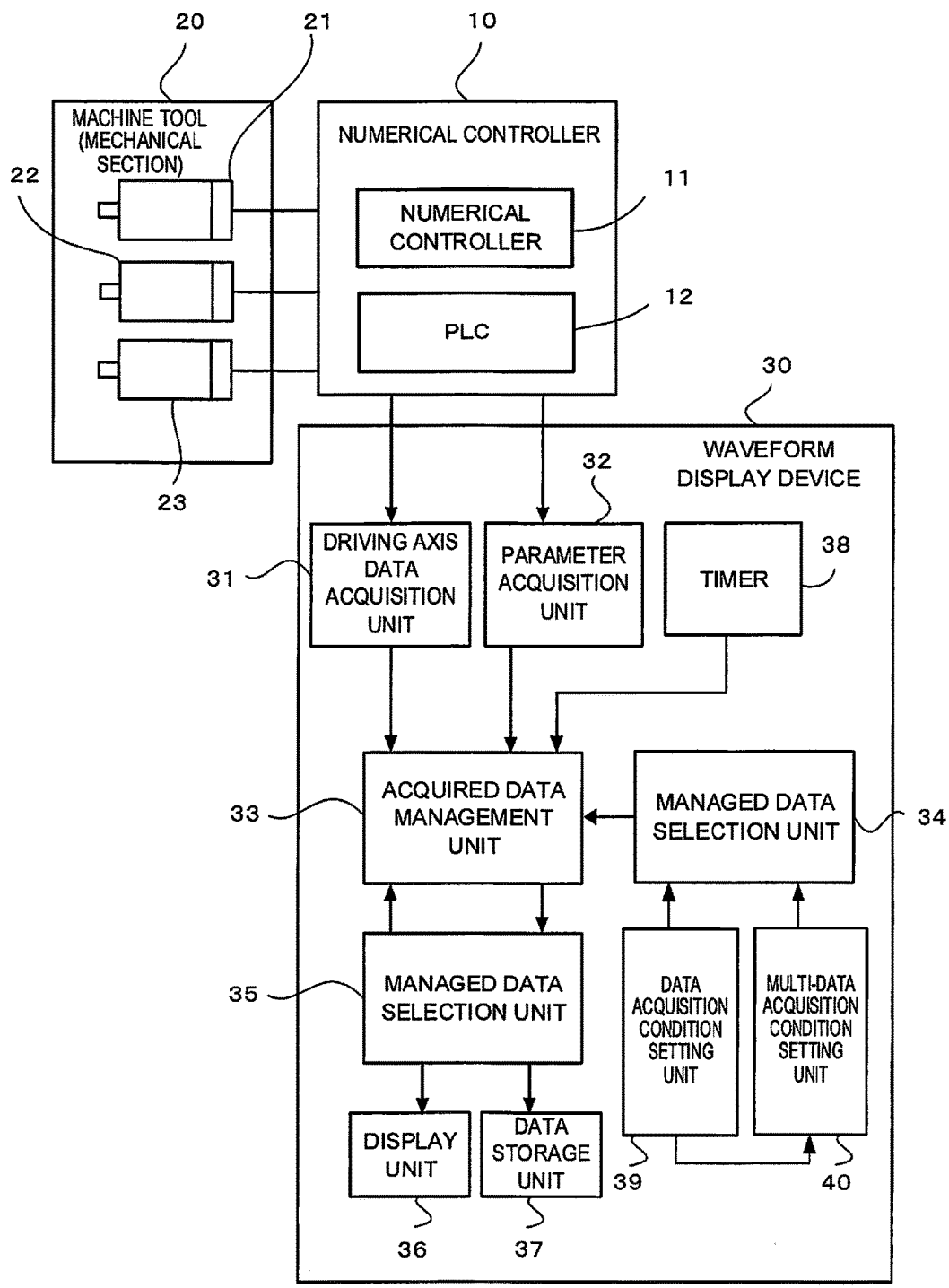
FIG. 1 is a block diagram illustrating a waveform display device capable of acquiring various data (a position, a speed, a torque, and the like) related to a driving axis and displaying the data as a waveform by being connected to a numerical controller of a machine tool.

FIG. 1 is a block diagram illustrating a waveform display device capable of acquiring various data (a position, a speed, a torque, and the like) related to a driving axis and displaying the data as a waveform by being connected to a numerical controller of a machine tool. The machine tool 20 that has a servo motor in a mechanical section and includes driving axes 21, 22, and 23 can include a necessary number of driving axes without being restricted to three driving axes. The numerical controller 10 controls respective driving axes such as the driving axes 21, 22, and 23 included in the machine tool 20 according to a processing program to control a relative position and attitude of a tool and a workpiece, thereby performing workpiece machining. In addition, the numerical controller 10 has a function of acquiring position data fed back from a position detector (not illustrated) included in each of the driving axes and generating speed data and acceleration data based on the position data.

The position data, the speed data, and the acceleration data correspond to driving axis data, and indicate operations of the driving axes. In addition, command data such as a position, a speed, and an acceleration generated by the numerical controller 10 and issued to the respective driving axes 21, 22, and 23 of the machine tool 20 is treated as driving axis data that indicates operations of the driving axes. Further, examples of data that indicates a state of a driving axis include data such as a temperature, a current, and a voltage fed back from the driving axes 21, 22, and 23, a current command and a voltage command issued to the driving axes 21, 22, and 23 from a numerical controller (NC) 11 of the numerical controller 10, and command data from a programmable logic controller (PLC) 12 issued to the machine tool 20. The data such as the temperature, the current, and the voltage fed back from the driving axes 21, 22, and 23 and the current command and the voltage command issued to the driving axes 21, 22, and 23 from the NC 11 of the numerical controller 10 generically refer to data of a physical quantity related to the driving axes.

The numerical controller 10 has a function of setting and changing various parameters for controlling the machine tool 20. The above-described numerical controller 10 has a known configuration. In the present embodiment, an N number of the processing program is sent together with the data of the physical quantity related to the driving axes to the waveform display device 30 from the numerical controller 10.

For example, the waveform display device 30 is a device having a computing means such as a personal computer (PC), a display means, a communication means, and a storage means. In addition, the waveform display device 30 includes a driving axis data acquisition unit 31 for acquiring driving axis data which is calculated or acquired from the machine tool 20 by the numerical controller 10, a parameter acquisition unit 32 for acquiring data of various parameters set in the numerical controller 10, and a timer 38 for generating time data. A touch panel-type display device can be used as the display means.

An acquired data management unit 33 manages various data acquired by the driving axis data acquisition unit 31 and the parameter acquisition unit 32 in real time from the numerical controller 10 such that the acquired data is associated with the time data generated by the timer 38. The driving axis data and the parameters managed by the acquired data management unit 33 can be arbitrarily selected by a managed data selection unit 34, and the selected data is output to a display unit 36 or a data storage unit 37 through a managed data output unit 35.

A description will be given of a method of selecting driving axis data and parameters by the managed data selection unit 34. The managed data selection unit 34 selects driving axis data and parameters set by a data acquisition condition setting unit 39 or a multi-data acquisition condition setting unit 40, and outputs the selected driving axis data and parameters to the managed data output unit 35. The managed data selection unit 34 selects the driving axis data and the parameters by a menu screen (not illustrated) and the like according to a setting condition which is preset in the data acquisition condition setting unit 39 or the multi-data acquisition condition setting unit 40.

The data acquisition condition setting unit 39 selects a data acquisition start/end trigger, a sampling period of data, and a type of acquired data. Thus, for example, these data can be set using a screen of a data acquisition condition setting 50 as in FIG. 2. When data needs to be acquired according to a plurality of different conditions, a plurality of types of necessary data acquisition conditions is set to set data acquisition condition names different from one another.

Figure 3:
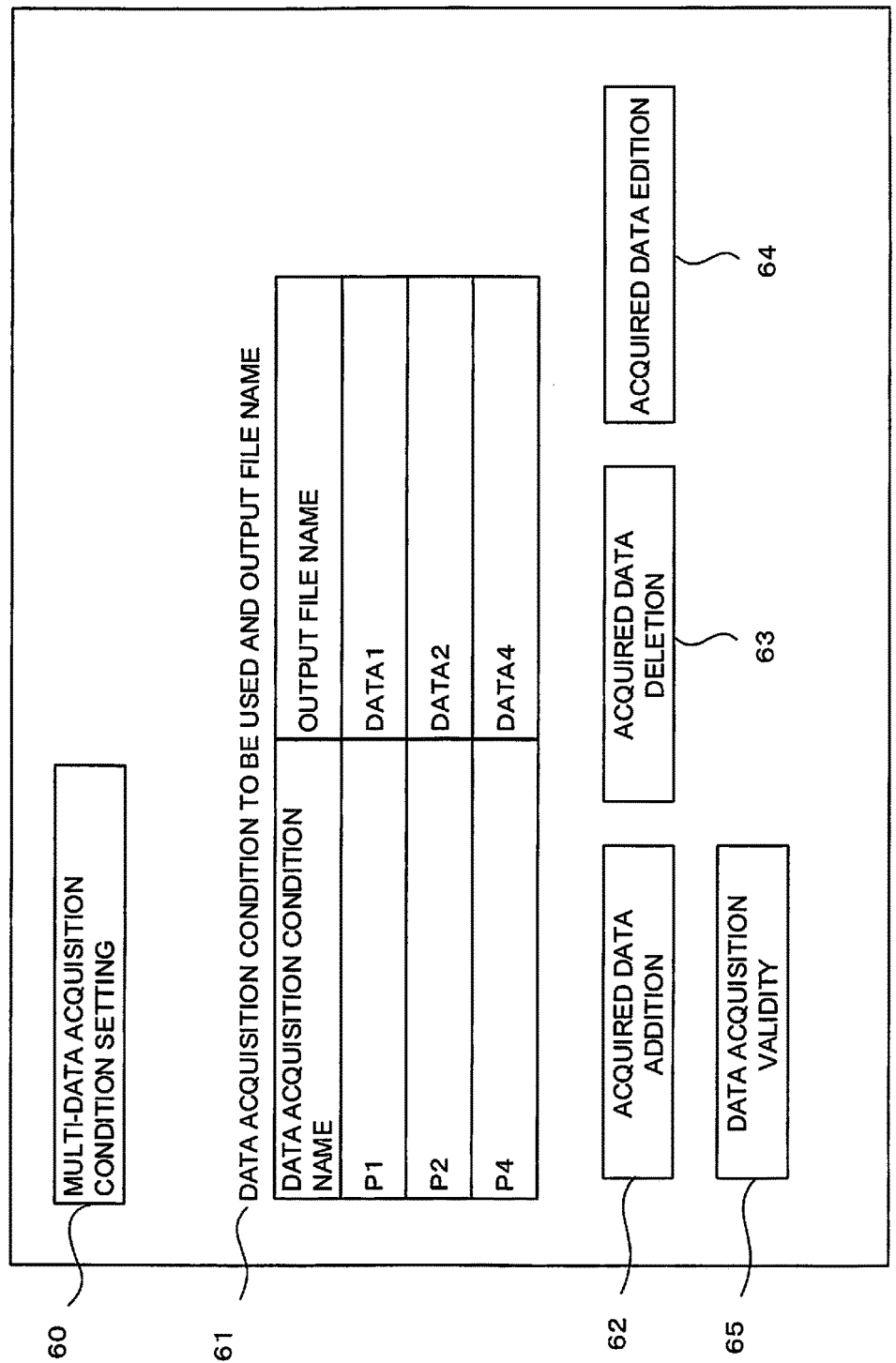
FIG. 3 is a diagram illustrating an example of a screen of a multi-data acquisition condition setting.

For example, if a plurality of data acquisition conditions is set when data is acquired once, the multi-data acquisition condition setting unit 40 can set necessary data acquisition conditions using a screen of a multi-data acquisition condition setting 60 as in FIG. 3. In the data acquisition condition setting by the multi-data acquisition condition setting unit 40, the data acquisition condition setting names set by the data acquisition condition setting unit 39 are input.

Figure 2:
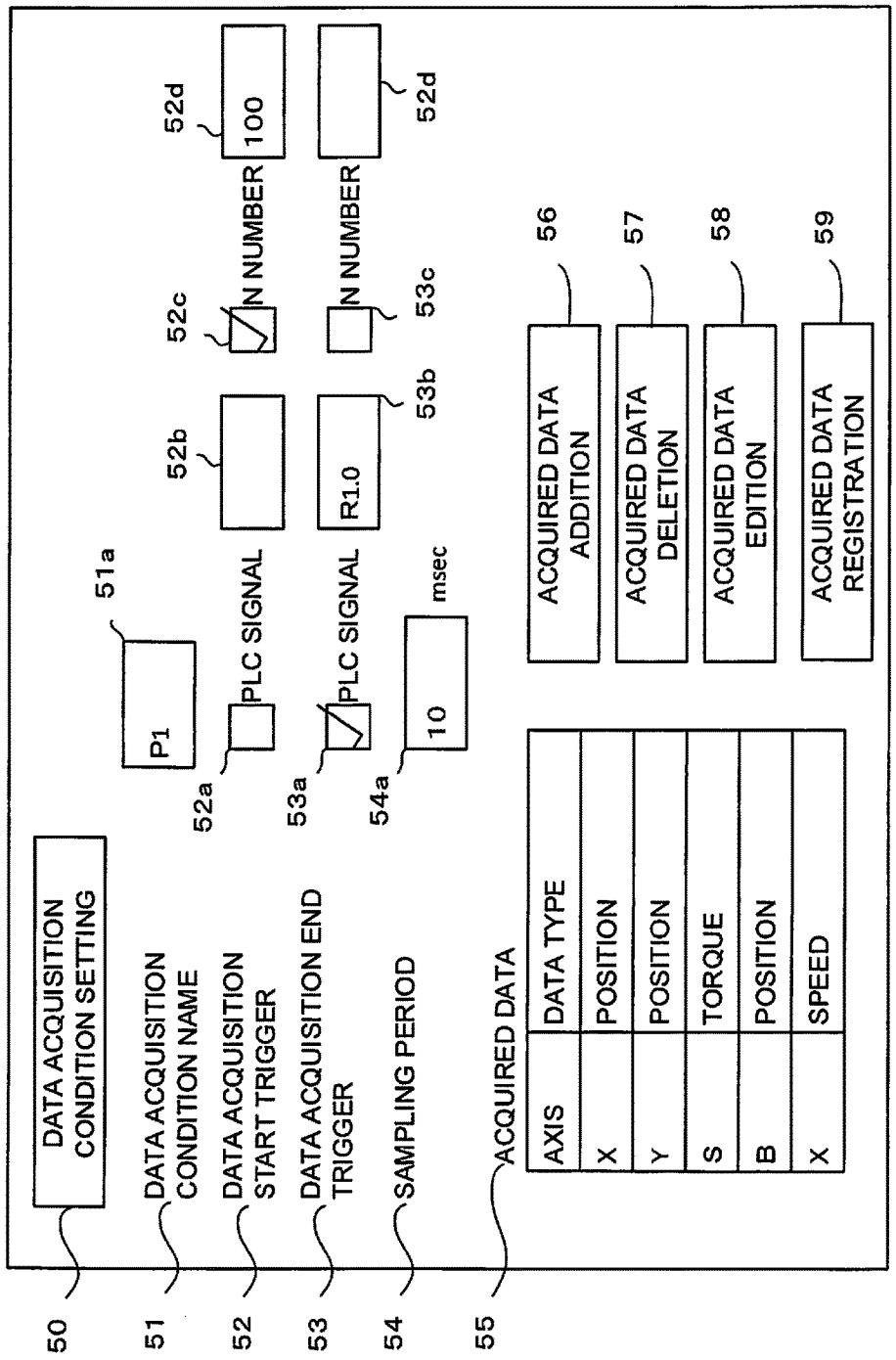
FIG. 2 is a diagram illustrating an example of a screen of a data acquisition condition setting.

The screens for setting illustrated in FIGS. 2 and 3 can be displayed through a display screen of the waveform display device 30. Settings may be stored in the data storage unit 37 of the waveform display device 30, or may be stored in storage units included in the data acquisition condition setting unit 39 and the multi-data acquisition condition setting unit 40.

FIG. 2 is a diagram illustrating an example of a screen of a data acquisition condition setting. Display of the screen of the data acquisition condition setting 50 is selected from a menu screen (not illustrated), and the screen is displayed on the display screen of the waveform display device 30. A check box, an input box, and a list of acquired data 55 are not displayed on an initial screen of the data acquisition condition setting 50.

The screen of the data acquisition condition setting 50 displays a data acquisition condition name 51, a data acquisition start trigger 52, a data acquisition end trigger 53, a sampling period 54, acquired data 55, an acquired data addition button 56 for instructing addition of acquired data, an acquired data deletion button 57 for instructing deletion of acquired data, an acquired data edition button 58 for instructing edition of acquired data, and an acquired data registration button 59 for instructing registration of set data.

A name is input as the data acquisition condition name 51 to an input box 51*a*. When a PLC signal corresponds to the data acquisition start trigger 52, a check box 52*a* is checked, and the signal is input to an input box 52*b*. When an N number of a processing program corresponds to the data acquisition start trigger 52, a check box 52*c* is checked, and a sequence number is input to an input box 52*d*. Similarly to the case of the data acquisition start trigger 52, a check box 53*a* is checked and a PLC signal is input to an input box 53*b* when the PLC signal corresponds to the data acquisition end trigger 53, or a check box 53*c* is checked and an N number of a processing program is input to an input box 53*d* when the N number corresponds to the data acquisition end trigger 53. The sampling period 54 inputs a numerical value of the sampling period to the check box 53*a*.

In order to select acquired data which is acquired as a condition name input to the input box 51*a* as the data acquisition condition name 51, a table of the acquired data 55 is displayed using the acquired data addition button 56. Then, a axis type or a data type is input or selected. The selected and acquired axis type and data type can be deleted using the acquired data deletion button 57. In addition, the selected and acquired axis type and data type can be edited using the acquired data edition button 58. Edition refers to changing of the data type or changing of the axis type.

When an input operation ends, data input using the screen of the data acquisition condition setting 50 is stored in a storage unit (not illustrated) of the data acquisition condition setting unit 39 or the data storage unit 37 using the acquired data registration button 59. In response to registration, the screen of the data acquisition condition setting 50 returns to an initial state. Here, data of the data acquisition start trigger 52, the data acquisition end trigger 53, the sampling period 54, and the acquired data 55 can be input using a new data acquisition condition name 51.

FIG. 3 is a diagram illustrating an example of a screen of the multi-data acquisition condition setting 60. Data of a data acquisition condition setting to be used can be selected from data of a plurality of data acquisition condition settings input from the screen of the data acquisition condition setting 50 of FIG. 2.

Display of the screen of the multi-data acquisition condition setting 60 is selected from a menu screen (not illustrated), and the screen is displayed on the display screen of the waveform display device 30. In an initial state of this screen, a table of a data acquisition condition to be used and an output file name 61 is not displayed. Alternatively, even when the table is displayed, the table is blank.

An acquired data addition button 62 is used when a data acquisition condition name and an output file name are added.

An acquired data deletion button 63 for deleting acquired data, an acquired data edition button 64, and a data acquisition validity button 65 are collectively displayed on the screen of the multi-data acquisition condition setting 60. When acquired data is deleted, the acquired data deletion button is used. When acquired data is edited, the acquired data edition button 64 is used. When inputting of a data acquisition condition and an output file name to be used ends, the data acquisition validity button 65 is pushed to store the data acquisition condition and the output file name in a storage unit (not illustrated) of the multi-data acquisition condition setting unit 40 or the data storage unit 37.

Figure 4:
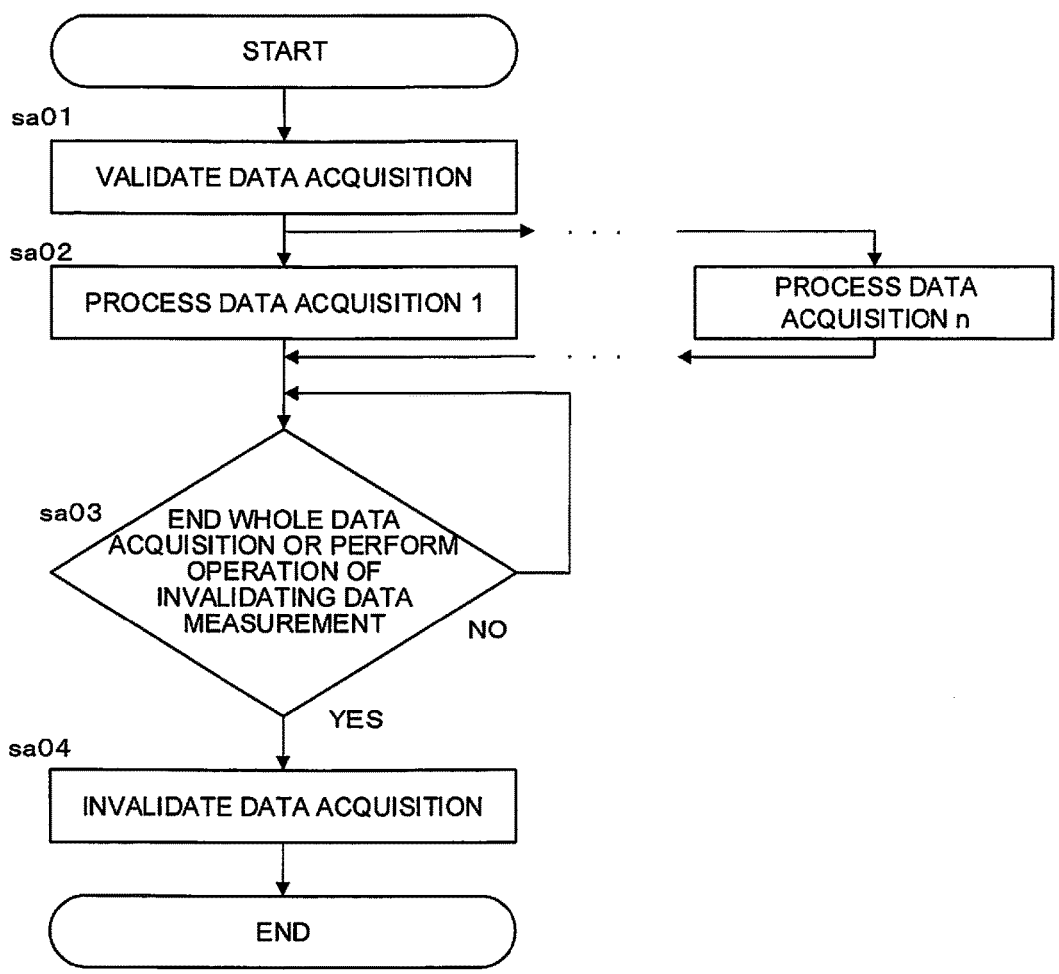
FIG. 4 is a flowchart illustrating data acquisition.
Figure 5:
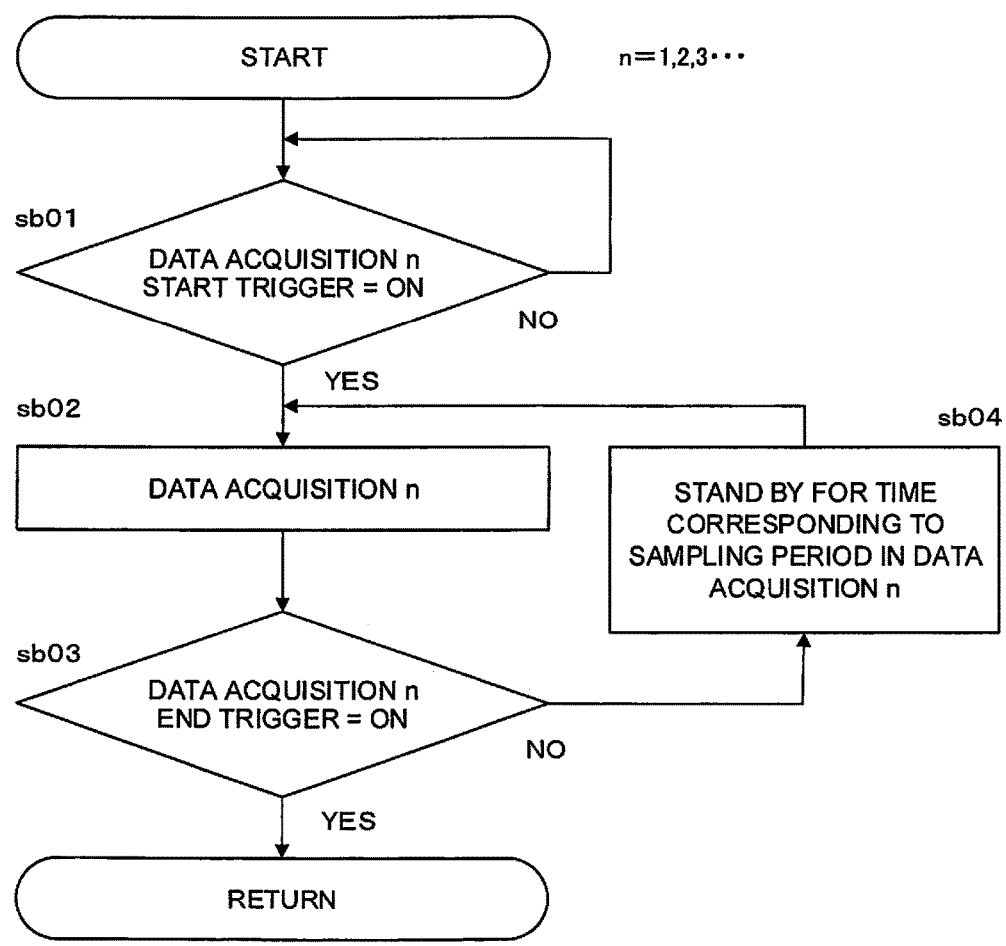
FIG. 5 is a flowchart of "processing of data acquisition n" of FIG. 4.
Figure 6:
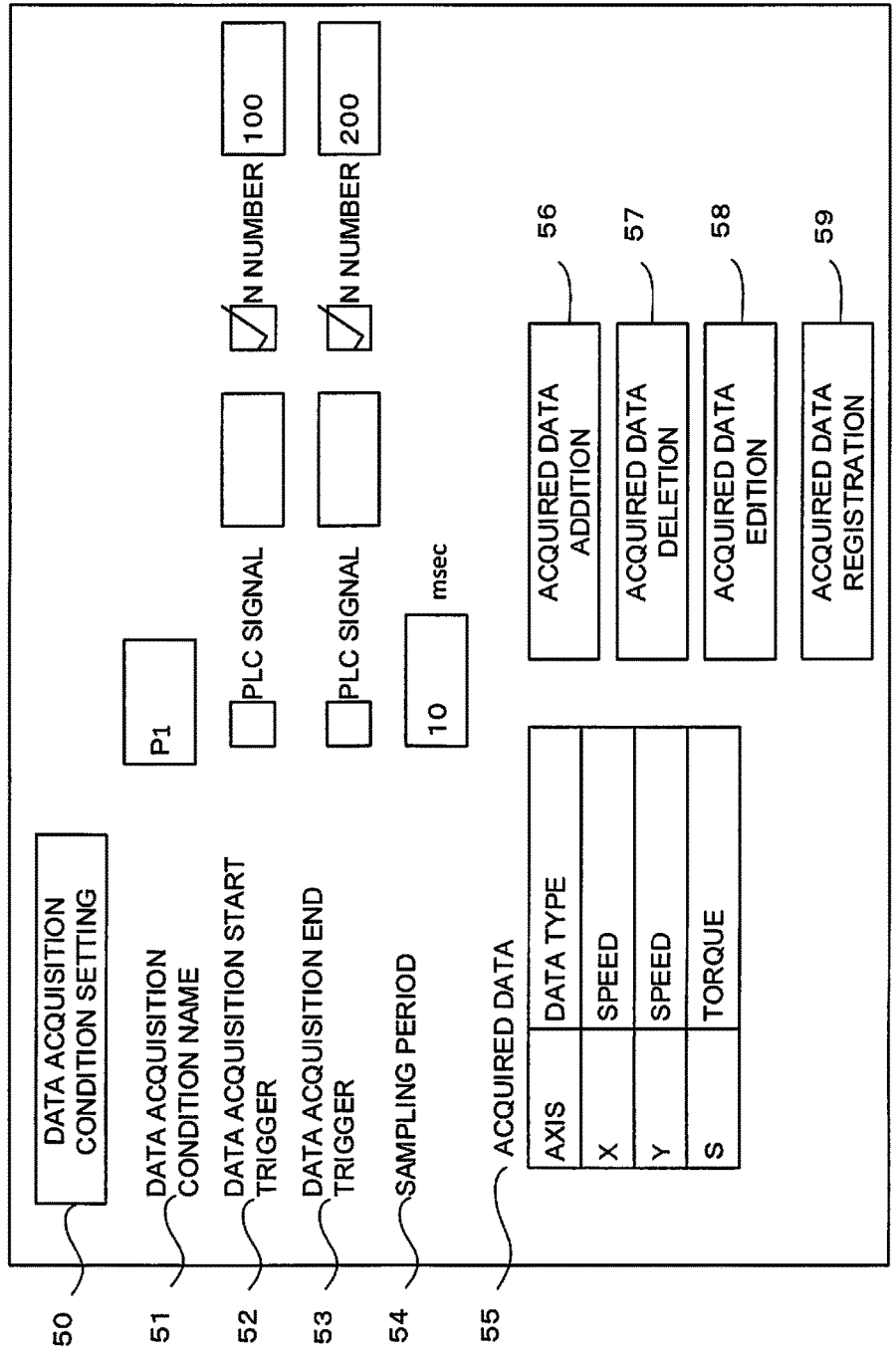
FIG. 6 is a diagram illustrating a setting example 1 of the screen of the data acquisition condition setting.
Figure 7:
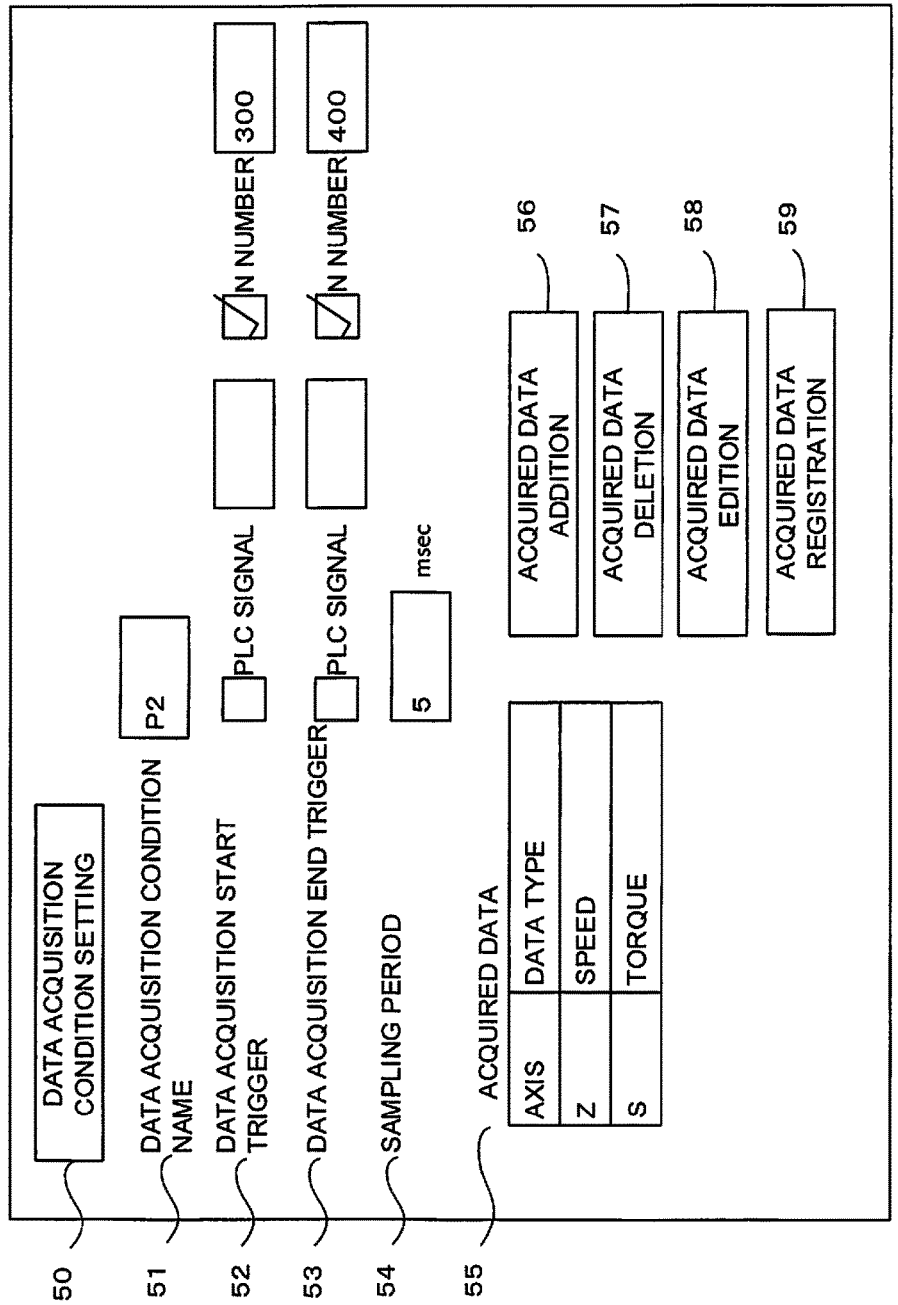
FIG. 7 is a diagram illustrating a setting example 2 of the screen of the data acquisition condition setting.
Figure 8:
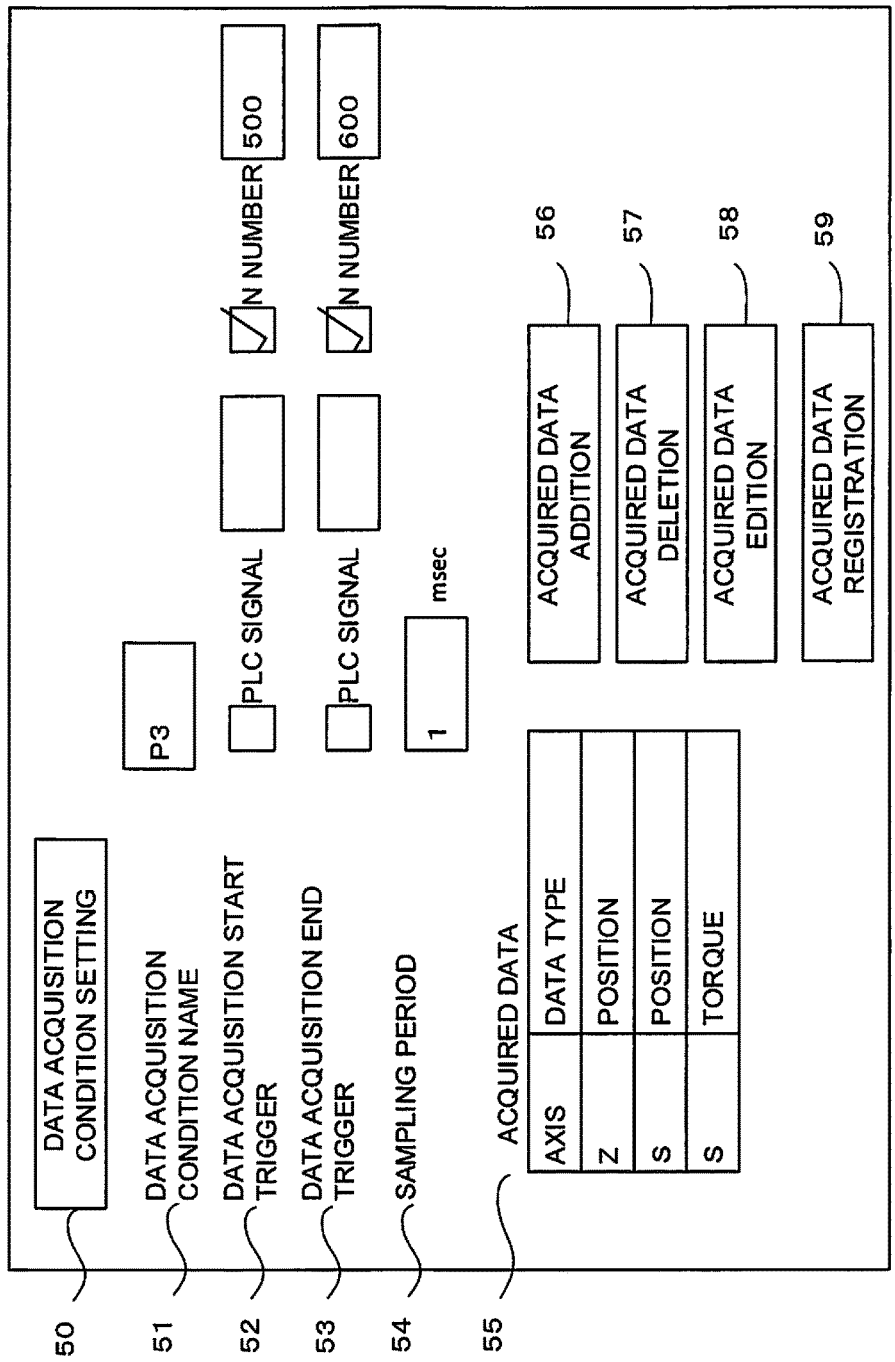
FIG. 8 is a diagram illustrating a setting example 3 of the screen of the data acquisition condition setting.
Figure 9:
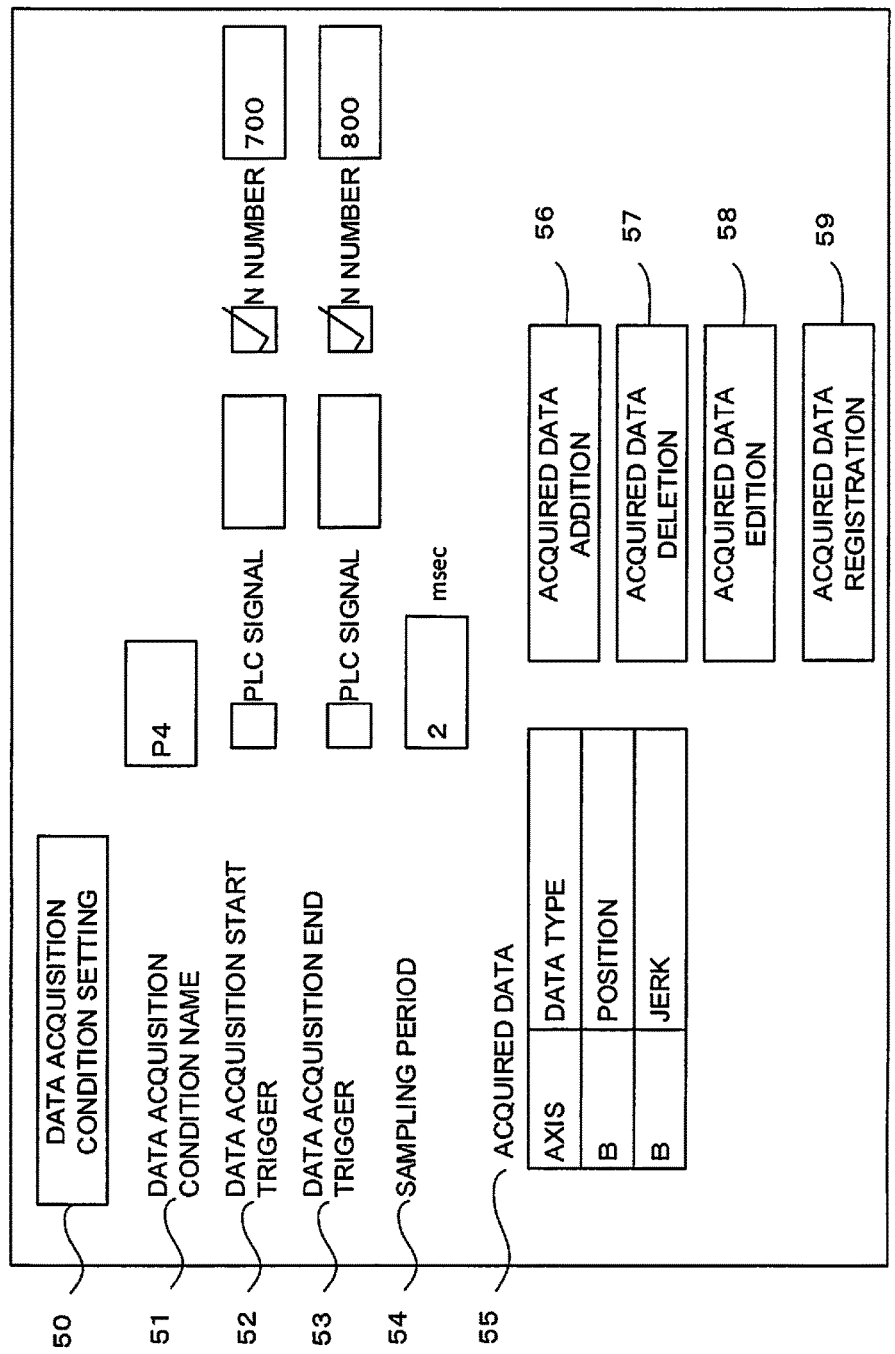
FIG. 9 is a diagram illustrating a setting example 4 of the screen of the data acquisition condition setting.
Figure 10:
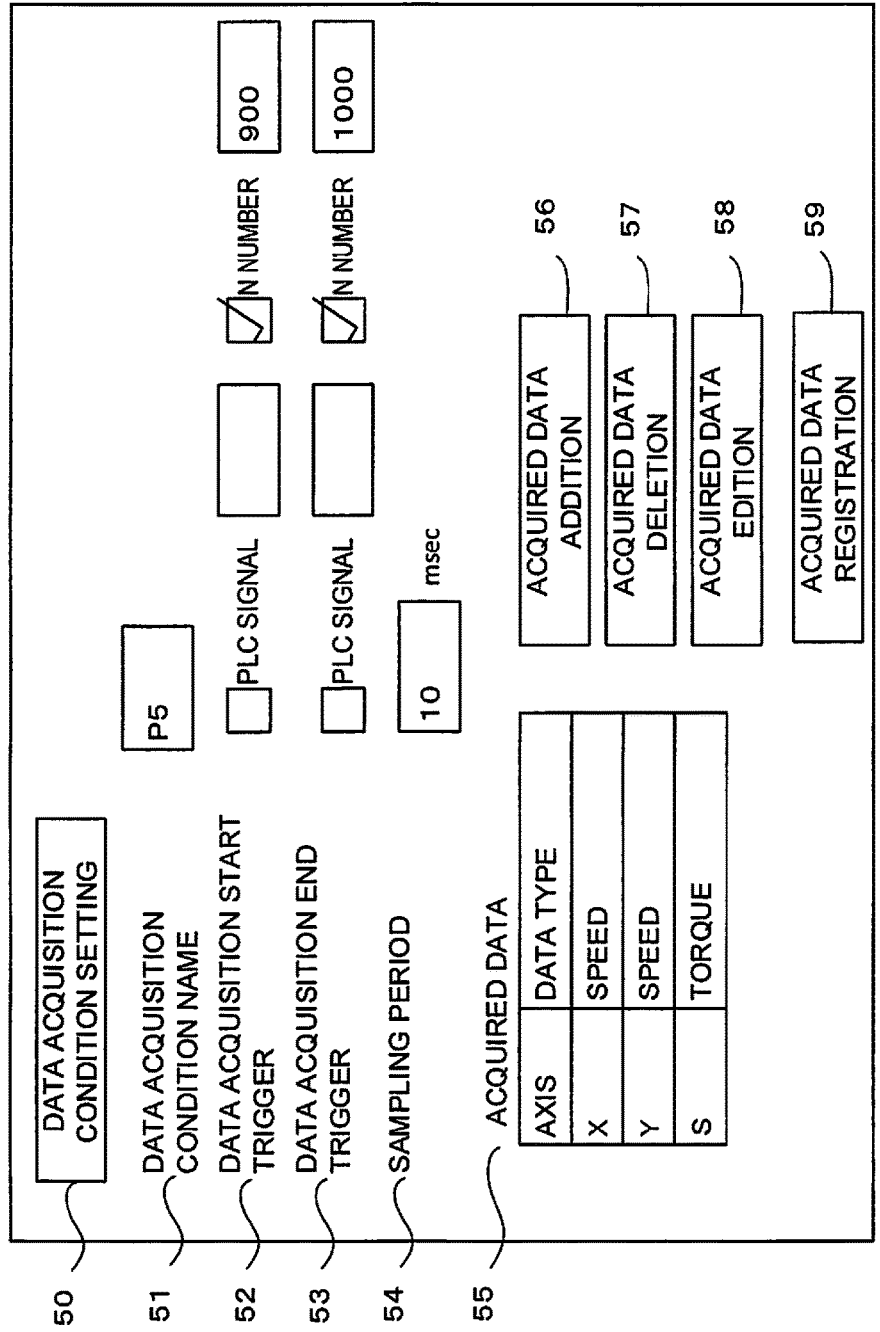
FIG. 10 is a diagram illustrating a setting example 5 of the screen of the data acquisition condition setting.

Next, acquisition of data of a physical quantity related to a driving axis by the waveform display device according to the present embodiment illustrated in FIGS. 1 to 3 will be described using FIGS. 4 and 5. A flowchart of data acquisition is illustrated in FIG. 4. Further, a flowchart of "data acquisition n" of FIG. 4 is illustrated in FIG. 5.

"Data acquisition n" (n=1, 2, 3, . . . ) of FIG. 4 corresponds to a data acquisition condition set by the data acquisition condition setting. "n" is equal to the number of data acquisition conditions set by the multi-data acquisition condition setting.

A description will be given of a flow of data acquisition. First, data acquisition is validated to perform data acquisition.

To validate data acquisition, for example, the data acquisition validity button 65 is installed on the screen of the multi-data acquisition condition setting of FIG. 3, and the button is pressed. In this way, whether a data start trigger of each data acquisition condition is turned ON is monitored. Data acquisition is performed according to each set data acquisition condition setting, and whole data acquisition ends. Alternatively, when an input operation is performed from a control panel of the numerical controller or the waveform display device to invalidate data acquisition, data acquisition is invalidated, and data acquisition ends.

Hereinafter, processing illustrated in FIG. 4 will be described according to steps. This processing corresponds to processing in the managed data selection unit 34 of FIG. 1.

Step sa01: Data acquisition is validated.

Step sa02: Processing of data acquisitions 1 to n is executed (n=1, 2, 3, . . . ).

Step sa03: Whether whole data acquisition ends is determined. When whole data acquisition ends, the operation proceeds to step sa04. Alternatively, whether an operation of invalidating data measurement is performed is determined. When the operation of invalidating data measurement is performed, the operation proceeds to step sa04. In other cases, the unit waits for processing of step sa02 to end.

Step sa04: Data acquisition is invalidated, and processing ends.

Hereinafter, processing illustrated in FIG. 5 will be described according to steps. This processing corresponds to processing of step sa02 of FIG. 4. Here, n=1, 2, 3, . . . . This value n is a numerical value corresponding to a data acquisition condition name.

Step sb01: Whether a start trigger of data acquisition n is turned ON is determined. When the start trigger is turned ON (YES), the operation proceeds to step sb02. When the start trigger is not turned ON (NO), the unit waits for the start trigger to be turned ON.

Step sb02: Data acquisition n is executed.

Step sb03: Whether an end trigger of data acquisition n is turned ON is determined. When the end trigger is turned ON (YES), processing ends. When the end trigger is not turned ON (NO), the operation proceeds to step sb04.

Step sb04: The unit stands by for a time corresponding to a sampling period in data acquisition n, and the operation returns to step sb02.

To verify acquired data, the acquired data is stored in a data storage unit (not illustrated) of the numerical controller 10 or the data storage unit 37 of the waveform display device 30 (see FIG. 1). The stored data can be displayed as a waveform on the display unit 36 of the waveform display device 30. A result of acquiring data is output for each data acquisition condition. An output file name can be designated in advance on the screen of the multi-data acquisition condition setting of FIG. 3.

Reacquisition of data will be described. "(1) Data acquisition condition setting" of FIGS. 2 and "(2) multi-data acquisition condition setting" of FIG. 3 are allowed to be stored in the data storage unit 37 of the waveform display device 30. For this reason, when data is acquired again under the same condition after changing a parameter or changing a processing program, operations of "(1) data acquisition condition setting" and "(2) multi-data acquisition condition setting" are unnecessary. Data can be acquired through an operation of "(3) data acquisition".

Here, an embodiment of the invention will be described using a processing program A and a necessary setting as examples. First, fix different settings are performed on the screen of the data acquisition condition setting (see FIGS. 6 to 10). Respective setting condition names are set as P1, P2, P3, P4, and P5. FIGS. 6 to 10 are examples of a setting screen corresponding to FIG. 2.

Figure 11:
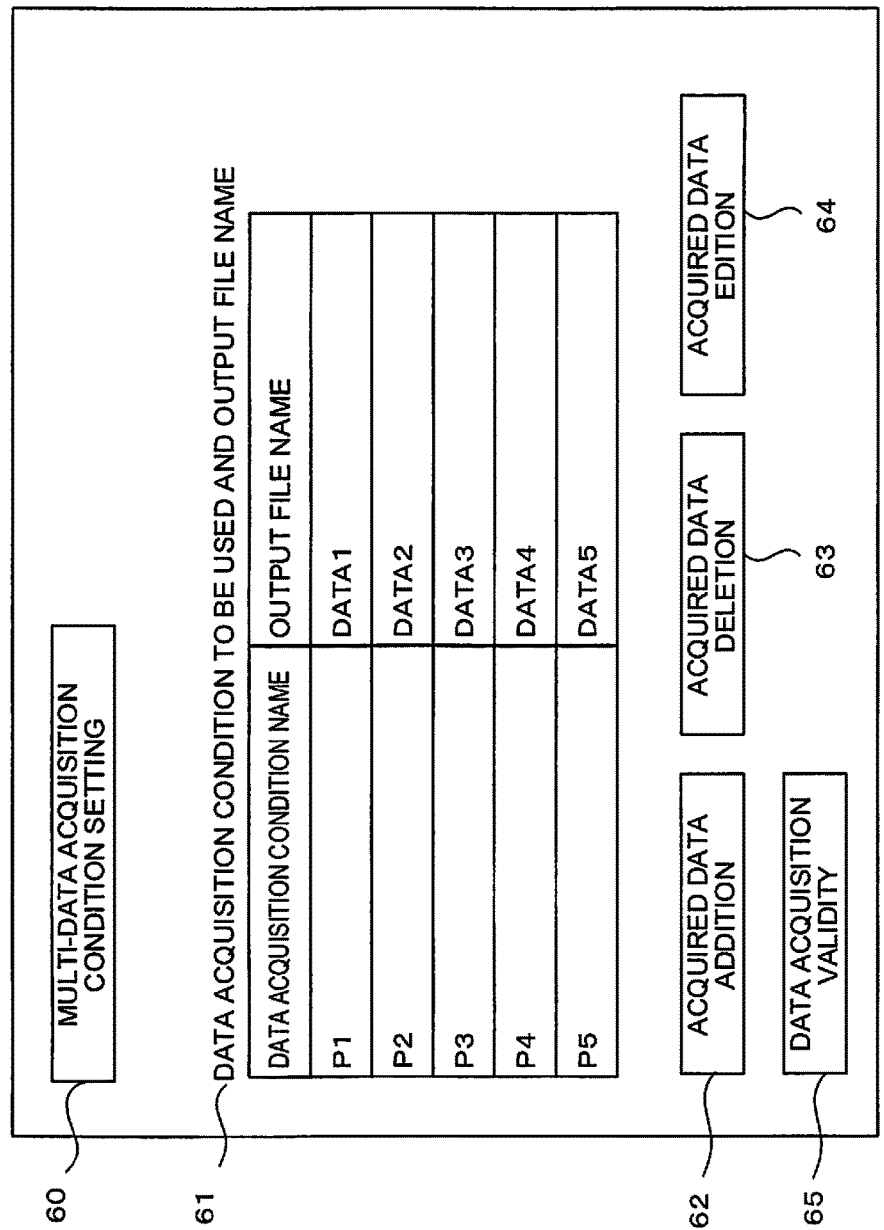
FIG. 11 is a diagram illustrating a setting example of the screen of the multi-data acquisition condition setting.

Subsequently, the set five data acquisition condition settings are set on the screen of the multi-data acquisition condition setting (see FIG. 11). A data acquisition setting condition name and a file name used when acquired data is output are set.

Figure 12:
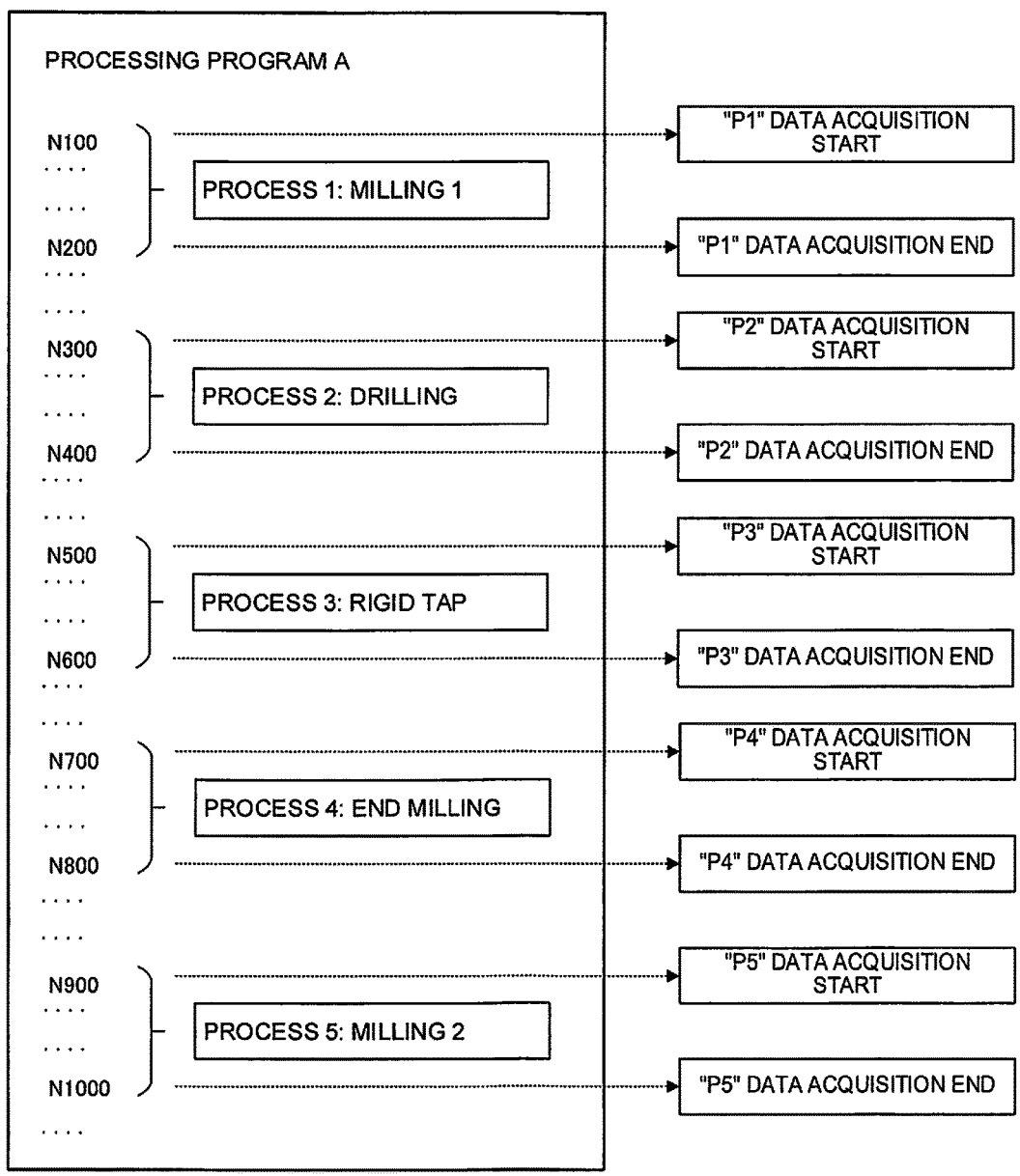
FIG. 12 is a diagram illustrating a processing program A and a trigger position of each data acquisition condition.
Figure 13:
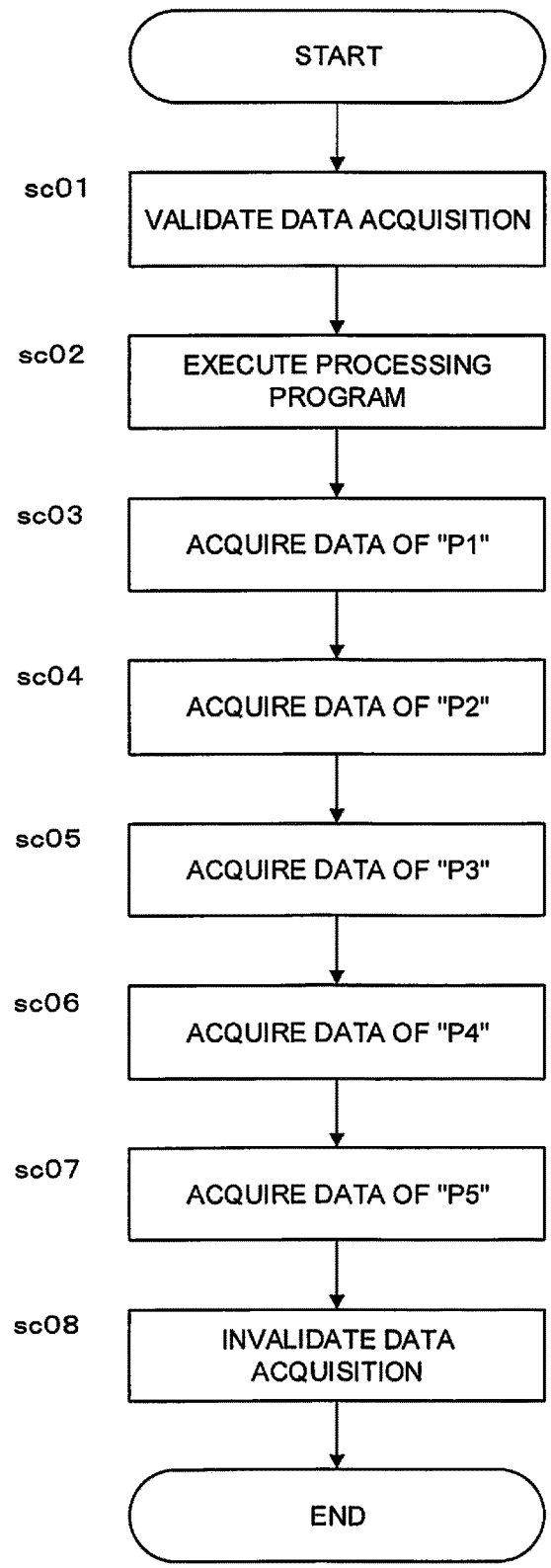
FIG. 13 is a flowchart corresponding to a case in which data is acquired using the processing program A.

When setting ends, the data acquisition validity button 65 is pressed. Then, the processing program A is executed. Data is acquired according to a data start/end trigger condition set under each of data acquisition conditions (FIGS. 12 and 13). According to execution of the processing program, data acquisition starts and ends according to a setting condition as illustrated in FIGS. 6 to 10. FIG. 13 illustrates acquisition of data set under setting conditions P1 to P5. When measurement of all data acquisition conditions ends, data acquisition is invalidated. After data acquisition ends, five files are created using file names set on the screen of the multi-data acquisition condition setting. A waveform can be displayed on the display unit 36 from data of each of the files.

Hereinbefore, embodiments of the invention have been described. However, the invention is not restricted to the above-described examples of the embodiments, and can be implemented in another aspect by appropriately changing the embodiments. For example, even though a PLC signal and an N number are used as types of triggers in FIG. 2, types such as a time when a button displayed on the display unit 36 of the waveform display device 30 is pressed may be increased.

In addition, with regard to data acquisition under a plurality of data acquisition conditions, a plurality of pieces of data may be simultaneously acquired. Alternatively, rather than simultaneously acquiring data under a plurality of data acquisition conditions, data may be acquired under one condition at all times by, for example, ending first data acquisition at the time of starting second data acquisition (a condition of completing data acquisition is considered to be satisfied).

There is an upper limit to acquirable data per time. Thus, when a plurality of pieces of data is simultaneously acquired, there is a possibility that restrictions will need to be imposed on the number of data to be acquired and a sampling period. However, when data corresponding to different purposes is desired to be acquired from separate axes at the same time, it is useful to simultaneously acquire a plurality of pieces of data.

According to the invention, unnecessary data acquisition can be avoided, and thus an extraction operation for data evaluation and the like are unnecessary. In this way, data can be accurately and rapidly evaluated, an operation time can be shortened at the time of acquiring data, and a data size of acquired data can be reduced.

Even though more data acquisition conditions are set when compared to the related art, the same data acquisition can be performed any number of times by performing setting once. In general, data acquisition is performed any number of times to adjust a processing program or a parameter, and thus an operation time can be shortened as a whole adjustment operation.

According to the invention, a waveform display device can be provided which has a function of allowing only necessary data to be acquired without a complicated operation by allowing a plurality of data acquisition conditions to be set with respect to one data acquisition.

The invention claimed is:

1. A waveform display device connected to a numerical controller controlling driving axes of a machine tool, the waveform display device comprising:
  a physical quantity data acquisition unit configured to acquire data of physical quantities related to the driving axes from the numerical controller;
  a physical quantity data acquisition condition setting unit configured to set a plurality of data acquisition conditions for a single processing program, which controls the numerical controller to drive the axes of the machine tool, the single processing program including a plurality of different processes, for extracting data from the data of the physical quantities acquired by the physical quantity data acquisition unit, the plurality of data acquisition conditions comprising at least:
    a first data acquisition condition for a first process of the plurality of different processes of the single processing program, the first data acquisition condition including
      a first sampling period,
      first conditions for starting and ending data acquisition associated with the first sampling period, and
      a first group of physical quantities relating to at least one of the driving axes, and the first group being associated with the first sampling period, and
    a second data acquisition condition for a second process of the plurality of different processes of the single processing program, the second data acquisition condition including
      a second sampling period,
      second conditions for starting and ending data acquisition associated with the second sampling period, and
      a second group of physical quantities relating to at least another one of the driving axes, and the second group being associated with the second sampling period;
  a physical quantity data extraction unit configured to extract data satisfying the first and second data acquisition conditions set by the physical quantity data acquisition condition setting unit from the data of the physical quantities related to the driving axes acquired at one time by the physical quantity data acquisition unit, the extracted data comprising at least:
    a first set of data of the first group of physical quantities acquired under the first data acquisition condition, and
    a second set of data of the second group of physical quantities acquired under the second data acquisition condition;
  a storage unit configured to store the data of the physical quantities extracted by the physical quantity data extraction unit; and
  a display unit configured to display the data of the physical quantities extracted by the physical quantity data extraction unit as at least one waveform,
  wherein the single processing program or parameters for controlling the driving axes of the machine tool are changed based on the acquired data of the physical quantities, and the numerical controller is configured to control the driving axes of the machine tool by the changed processing program or parameters.

2. The waveform display device according to claim 1, wherein the physical quantity data extraction unit is configured to acquire the data of the physical quantities in parallel based on two or more data acquisition conditions among the plurality of data acquisition conditions set by the physical quantity data acquisition condition setting unit.

3. The waveform display device according to claim 1, further comprising an acquired data management unit configured to manage data acquired, real time, by the physical quantity data acquisition unit from the numerical controller.

4. The waveform display device according to claim 1, wherein the acquired data is associated with time data generated by a timer.

5. The waveform display device according to claim 1, wherein the physical quantity data acquisition condition setting unit comprises a multi-data acquisition condition setting unit configured to set a plurality of output files for the plurality of data acquisition conditions, respectively.

* * * * *